United States Patent
Sung et al.

(10) Patent No.: US 8,886,864 B1
(45) Date of Patent: Nov. 11, 2014

(54) INTERFACE CARD APPARATUS

(71) Applicant: Wistron Corporation, New Taipei (TW)

(72) Inventors: Yung-Chi Sung, New Taipei (TW);
Wei-Ming Chien, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/071,721

(22) Filed: Nov. 5, 2013

(30) Foreign Application Priority Data

May 17, 2013 (TW) .............................. 102117639 A

(51) Int. Cl.
*G06F 13/16* (2006.01)
*G06F 1/00* (2006.01)
*G06F 13/12* (2006.01)

(52) U.S. Cl.
CPC ........................................ *G06F 1/00* (2013.01)
USPC ................. 710/313; 710/300; 710/62; 710/74

(58) Field of Classification Search
CPC ......... G06F 13/00; G06F 13/16; G06F 13/12; G06F 13/20; G06F 13/28
USPC ................ 710/300, 301, 305, 313, 62–63, 74
See application file for complete search history.

(56) References Cited

U.S. PATENT DOCUMENTS

| | | | |
|---|---|---|---|
| 6,292,863 B1 * | 9/2001 | Terasaki et al. ................ | 710/313 |
| 6,418,501 B1 * | 7/2002 | Gama et al. .................... | 710/305 |
| 7,254,664 B2 * | 8/2007 | Hsieh ............................. | 710/315 |
| 7,277,973 B2 * | 10/2007 | Bando ............................ | 710/305 |
| 7,370,168 B2 * | 5/2008 | Kanamori et al. ............. | 711/167 |
| 7,673,080 B1 * | 3/2010 | Yu et al. .......................... | 710/62 |
| 8,259,613 B2 | 9/2012 | Cromer et al. | |
| 2003/0212848 A1 * | 11/2003 | Liu et al. ........................ | 710/305 |
| 2004/0215996 A1 * | 10/2004 | Kanamori et al. ............ | 713/600 |
| 2005/0198423 A1 * | 9/2005 | Hsieh ............................. | 710/301 |
| 2007/0055823 A1 * | 3/2007 | Jo et al. ......................... | 711/115 |
| 2007/0101193 A1 * | 5/2007 | Johnson et al. ................ | 714/25 |
| 2007/0283053 A1 * | 12/2007 | Liu et al. ........................ | 710/11 |
| 2010/0223412 A1 * | 9/2010 | Jung ............................. | 710/301 |
| 2012/0033370 A1 * | 2/2012 | Reinke et al. ............... | 361/679.4 |

* cited by examiner

*Primary Examiner* — Christopher Shin
(74) *Attorney, Agent, or Firm* — McClure, Qualey & Rodack, LLP

(57) ABSTRACT

An interface card apparatus is provided. The interface card includes a transmission interface, an interface converter, a system on chip, a first connector, a bus switch, a network connector, and a power switch. The transmission interface includes a data channel, a power pin, a network channel, a switch pin, a power enabling pin, and a sharing pin. The system on chip, controlled by the sharing pin, performs a file sharing program. The bus switch, controlled by the switch pin, couples the connector to the channel or the interface converter. The network connector is coupled the system on chip and the network channel, and the power switch, controlled by the power enabling pin, couples the power pin to the system on chip.

20 Claims, 7 Drawing Sheets

INTERFACE CARD APPARATUS

This application claims the benefit of Taiwan application Serial No. 102117639, filed May 17, 2013, the subject matter of which is incorporated herein by reference.

BACKGROUND OF THE INVENTION

1. Field of the Invention

The invention relates in general to an electronic device, and more particularly to an interface card apparatus.

2. Description of the Related Art

As the science and technology progress, the types of electronic devices increase and the consumers may own several types of the electronic devices, such as mobile phones, tablet computers, notebook computers, or personal computers, and so on. These electronic devices may store repeated data, or same types of data are stored in different electronic devices. This makes data management difficult or the problem of ineffective use of the storage space.

For resolving this problem, network attached storage (NAS) devices are provided. An NAS device is an electronic device independent of the computers as well as a storage device for file access by the computers through network connection. Specifically, the NAS device may connect to one or more high capacity storage drive and enable the user to access the data of the storage drive through network connection.

However, such external NAS device has to be disposed on a desk or the ground, and thus occupies external space. In addition, the NAS device is required to be powered by external power source, which also occupies one of the limited indoor sockets. It is inconvenient to use in that way. Thus, it becomes an important topic of how to make the user conveniently sharing files for the electronic devices.

SUMMARY OF THE INVENTION

The disclosure is directed to an interface card apparatus.

According to an embodiment of the disclosure, an interface card apparatus is provided. The interface card apparatus includes a transmission interface, an interface converter, a system on chip, a first connector, a bus switch, a network connector, and a power switch. The transmission interface includes a data channel, a power pin, a network channel, a switch pin, a power enabling pin, and a sharing pin. The system on chip, controlled by the sharing pin, is used for performing a file sharing program. The bus switch, controlled by the switch pin, is employed to couple the connector to the channel or the interface converter. The network connector is coupled the system on chip and the network channel, and the power switch, controlled by the power enabling pin, is used for coupling the power pin to the system on chip.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

TABLE 1

| Pin number | Name |
| --- | --- |
| Pin 1 | WAKE # |
| Pin 2 | 3.3VAUX |
| Pin 3 | USB3_R-/SATA_R-/USB3_R-/LAN3-/LAN3- |
| Pin 4 | GND |
| Pin 5 | USB3_R+/SATA_R+/USB3_R+/LAN3+/LAN3+ |
| Pin 6 | 1.5V |
| Pin 7 | CLKREQ# |
| Pin 8 | SATA_R-/USB3_R-/LAN1-/LAN1-/LAN1- |
| Pin 9 | GND |
| Pin 10 | SATA_R+/USB3_R+/LAN1+/LAN1+/LAN1+ |
| Pin 11 | REFCLK-/REFCLIK-/USB2-/USB2-/USB2- |
| Pin 12 | GND |
| Pin 13 | REFCLK+/REFCLK+/USB2+/USB2+/USB2+ |
| Pin 14 | SATA_T-/USB_T-/LAN0-/LAN0-/LAN0- |
| Pin 15 | GND |
| Pin 16 | SATA_T+/USB_T+/LAN0+/LAN0+/LAN0+ |
| Pin 17 | USB_T-/SATA_T-/USB_T-/LAN2-/LAN2- |
| Pin 18 | GND |
| Pin 19 | USB_T+/SATA_T+/USB_T+/LAN2+/LAN2+ |
| Pin 20 | GPI_SOC_SHARING |
| Pin 21 | GND |
| Pin 22 | PERST# |
| Pin 23 | PERn0/PERn0/SATA_R-/USB3_R-/SATA_R- |
| Pin 24 | +3.3Vaux |
| Pin 25 | PERp0/PERp0/SATA_R+/USB3_R+/SATA_R+ |
| Pin 26 | GND |
| Pin 27 | GND |
| Pin 28 | +1.5V |
| Pin 29 | GND |
| Pin 30 | SMB_CLK/SMB_CLK/UART_TX/UART_TX/UART_TX |
| Pin 31 | PERn0/PERn0/SATA_T-/USB3_T-/SATA_T- |
| Pin 32 | SMB_DATA/SMB_DATA/UART_RX/UART_RX/UART_RX |
| Pin 33 | PERp0/PERp0/SATA_T+/USB3_T+/SATA_T+ |
| Pin 34 | GND |
| Pin 35 | GND |
| Pin 36 | USB_D- |
| Pin 37 | TYPEDET1 |
| Pin 38 | USB_D+ |
| Pin 39 | +3.3Vaux |
| Pin 40 | TYPEDET2 |
| Pin 41 | +3.3Vaux |
| Pin 42 | GPO_PWR_EN |
| Pin 43 | GND |
| Pin 44 | GPO_USBSOC_SEL |
| Pin 45 | +5Vaux |
| Pin 46 | GPI_SHARE_SWITCH |
| Pin 47 | +5Vaux |
| Pin 48 | +1.5V |
| Pin 49 | +5Vaux |
| Pin 50 | GND |
| Pin 51 | +5Vaux |
| Pin 52 | +3.3Vaux |

Figure 1:
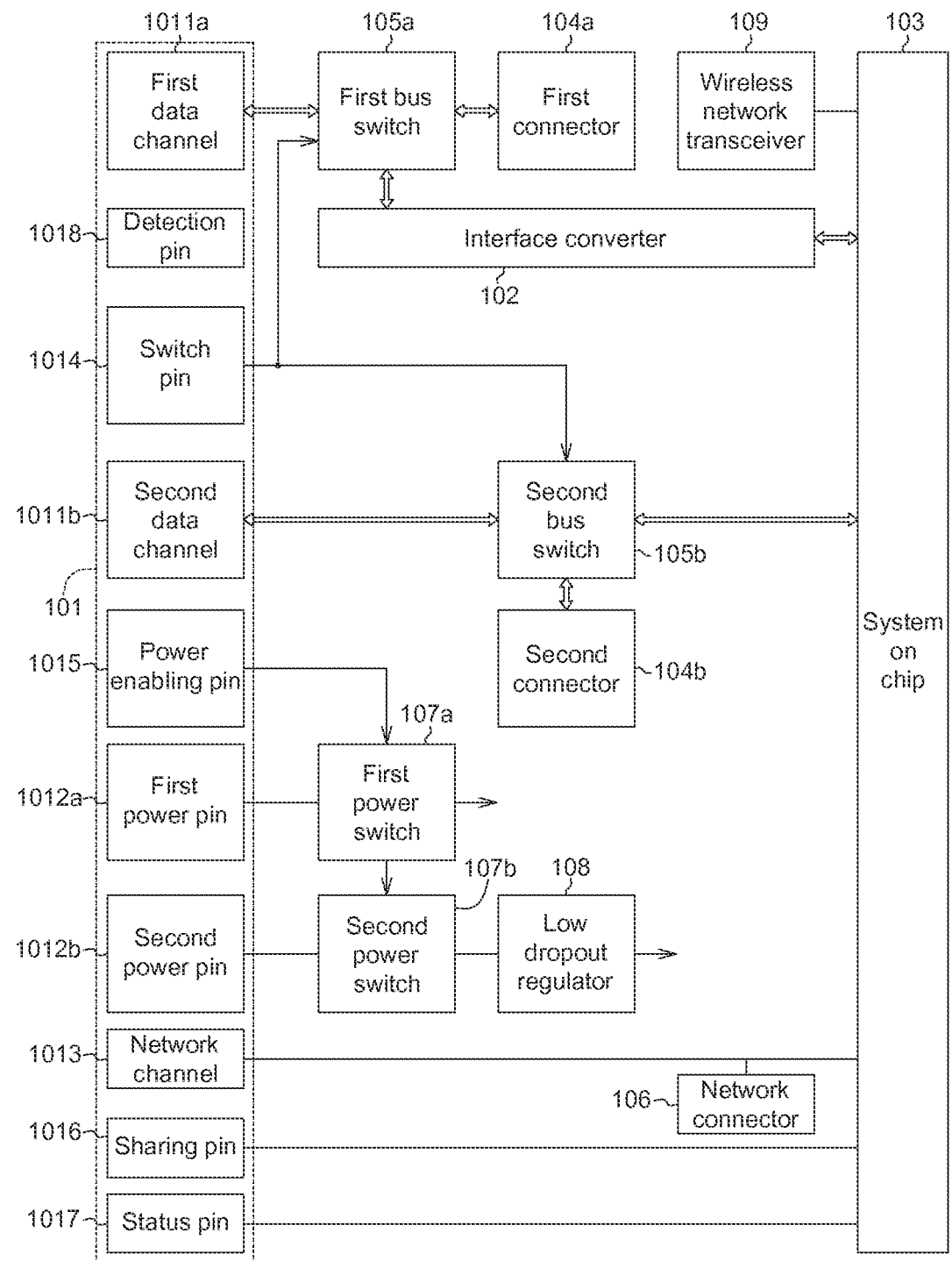
FIG. 1 is a block diagram illustrating an interface card according to a first embodiment.

Referring to FIG. 1 and Table 1, FIG. 1 is a block diagram illustrating an interface card 1 according to a first embodiment and Table 1 provides an example of definition of pins of a transmission interface according to the first embodiment. The interface card 1 includes a transmission interface 101, an interface converter 102, a system-on-chip 103, a first connector 104, a second connector 104b, a first bus switch 105a, a second bus switch 105b, a network connector 106, a first power switch 107a, a second power switch 107b, and a low dropout regulator 108. The first connector 104a is used for coupling a first storage device and the second connector 104b is used for coupling a second storage device. The first connector 104a, for example, is a serial advanced technology attachment (SATA) connector or an external serial advanced technology attachment (e-SATA) connector, and the second connector 104b, for example, is a universal serial bus (USB) connector. The first storage device, for example, is a storage device built in or independent of a computer, and the second storage device is a storage device independent of the computer, for example. The interface converter 102 and a wireless transceiver 109 are coupled to the system-on-chip 103.

The transmission interface 101 is compliant with the mini-PCIE interface and includes a first data channel 1011a, a second data channel 1011b, a first power pin 1012a, a second power pin 1012b, a network channel 1013, a switch pin 104, a power enabling pin 1015, a sharing pin 1016, a status pin 1017, and a detection pin 1018. The network connector 106 is coupled to the system on chip 103 and the network channel 1013, and the network connector 106 is a RJ45 connector, for example.

The first data channel 1011a includes pins 23, 25, 31, 33 as shown in FIG. 1, for example. The second data channel 1011b includes pins 11 and 13 as shown in FIG. 1, for example. The network channel 1013 includes pins 14, 16, 8, 10, 17, 19, 3, and 5 as shown in FIG. 1, for example. The first power pin 1012a includes pins 45, 47, 49, and 51 as shown in FIG. 1, for example, wherein the first power pin 1012a transmits a working voltage of 5V. The second power pin 1012b includes pins 2, 24, 39, 41, and 52 as shown in FIG. 1, for example, wherein the second power pin 1012b transmits a working voltage of 3.3V. The switch pin 1014 is pin 44 as shown in FIG. 1, for example, and the power enabling pin 1015 is pin 42 as shown in Table 1, for example. The sharing pin 1016 is pin 46 as shown in FIG. 1, for example, and the status pin 1017 is pin 20 as shown in Table 1, for example. The detection pin 1018 includes pins 37 and 40 as shown in FIG. 1, for example. The detection pin 1018 is used for detecting the type of the interface card 1, and the status pin 1017 is used for indicating the status of reading data of the system on chip 103.

It is noted that one pin may be defined for different types of functions. For example, pins 3, 5, 17, and 19 may be employed as SATA data channel in addition to the network channel 1013. Besides, pins 3, 5, 17, and 19 may be employed as the data channel of USB 3.0. Whether pins 3, 5, 8, 10, 14, 16, 17, and 19 are employed as the network channel 103, the SATA data channel, or the USB 3.0 data channel can be determined by the detection results from the detection pin 1018 (pins 37 and 40).

The system on chip 103, controlled by the sharing pin 1016, performs a file sharing program, and the system on chip 1013, for example, is a network attached storage (NAS) control chip. The first bus switch 105a, controlled by the switch pin 1014, couples the first connector 104a to the first data channel 1011a or the interface converter 102, and the second bus switch 105b, controlled by the switch pin 1014, couples the second connector 104b to the second data channel 1011b or the system on chip 103. When the system on chip 103 is executing the file sharing program, the first bus switch 105a couples the first connector 104a to the interface converter 102, and the second bus switch 105b couples the second connector 104b to the system on chip 103. When the system on chip 103 is executing the file sharing program, the system on chip 103 accesses the first storage device through the first connector 104a, the first bus switch 105a, and interface converter 102, and the system on chip 103 accesses the second storage device through the second connector 104b and the second bus switch 105b.

When the system on chip 103 is executing the file sharing program, the first power switch 107a, controlled by the power enabling pin 1015, couples the first power pin 1012a to the system on chip 103, so as to provide a working voltage of 5V to the system on chip 103. The second power switch 107b, controlled by the power enabling pin 1015, couples the second power pin 1012b to the low dropout regulator 108, so as to provide a working voltage of 3.3V to the low dropout regulator 108. The low dropout regulator 108 then converts the working voltage of 3.3V to a working voltage of 1.8V, for example.

Figure 2:
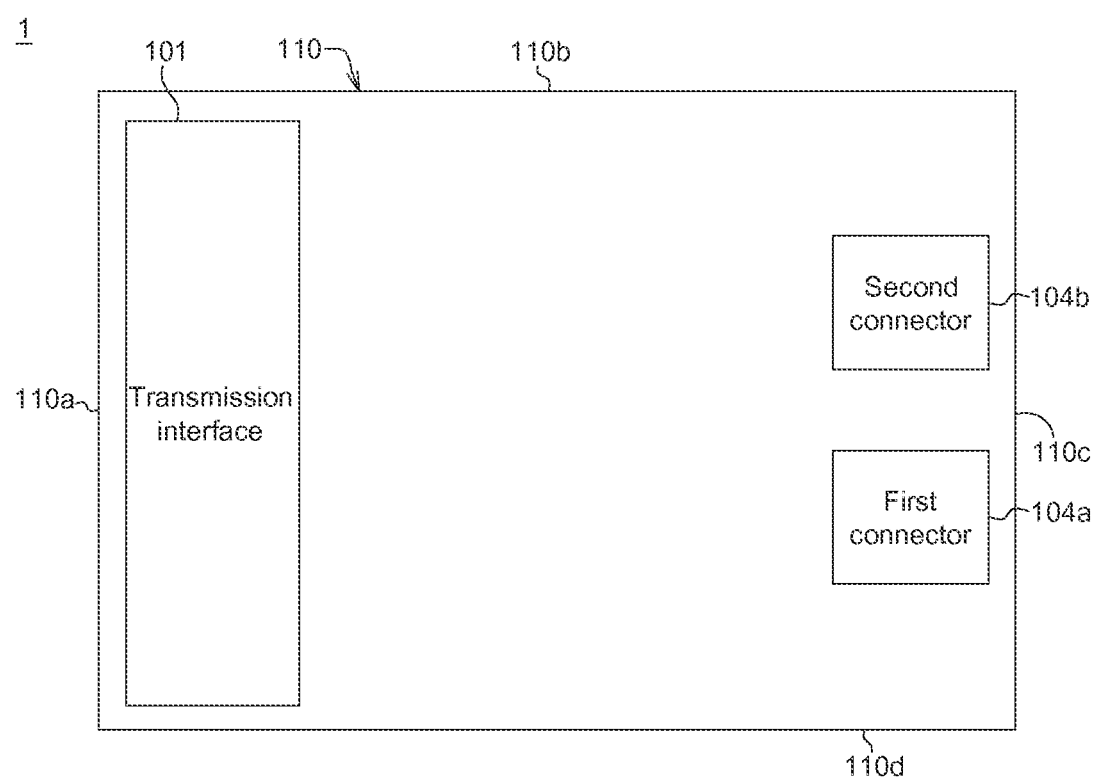
FIG. 2 is a diagram illustrating an arrangement of a transmission interface, a first connector, and a second connector according to the first embodiment.

Referring to FIG. 2, a diagram illustrates an arrangement of a transmission interface, a first connector, and a second connector according to the first embodiment. The interface card 1 further includes a printed board circuit 110. The printed board circuit 110 includes a first side 110a, a second side 110b, a third side 110c, and a fourth side 110d. The first side 110a is opposite the third side 110c, and the second side 110b is opposite is opposite the fourth side 110d. The transmission interface 101 is disposed near the first side 110a, and the first connector 104a and the second connector 104b are disposed near the third side 110c. In this way, if the interface card is designed to be not compliant with the NAS device, a main board of a system may include the first connector 104a and the second connector 104b, disposed in an exposed manner. Conversely, if the interface card is designed to be compliant with the NAS device, the main board of the system no longer needs to include the first connector 104a and the second connector 104b to be disposed. When the interface card as shown in FIG. 2 is inserted into the main board of the system, the first connector 104a and the second connector 104b disposed on the main board of the system can be substituted by the first connector 104a and the second connector 104b of the interface card. In this design, the user can connect to the first storage device externally by using the exposed first connector 104a, or can connect to the second storage device externally through the second connector 104b, regardless of whether the interface card is compliant with the NAS device or not. The difference is that for one compliant with the NAS device, the first storage device externally connected to the first connector 104a or the second storage device externally connected to the second connector 104b can be shared for usage.

Second Embodiment

Figure 3:
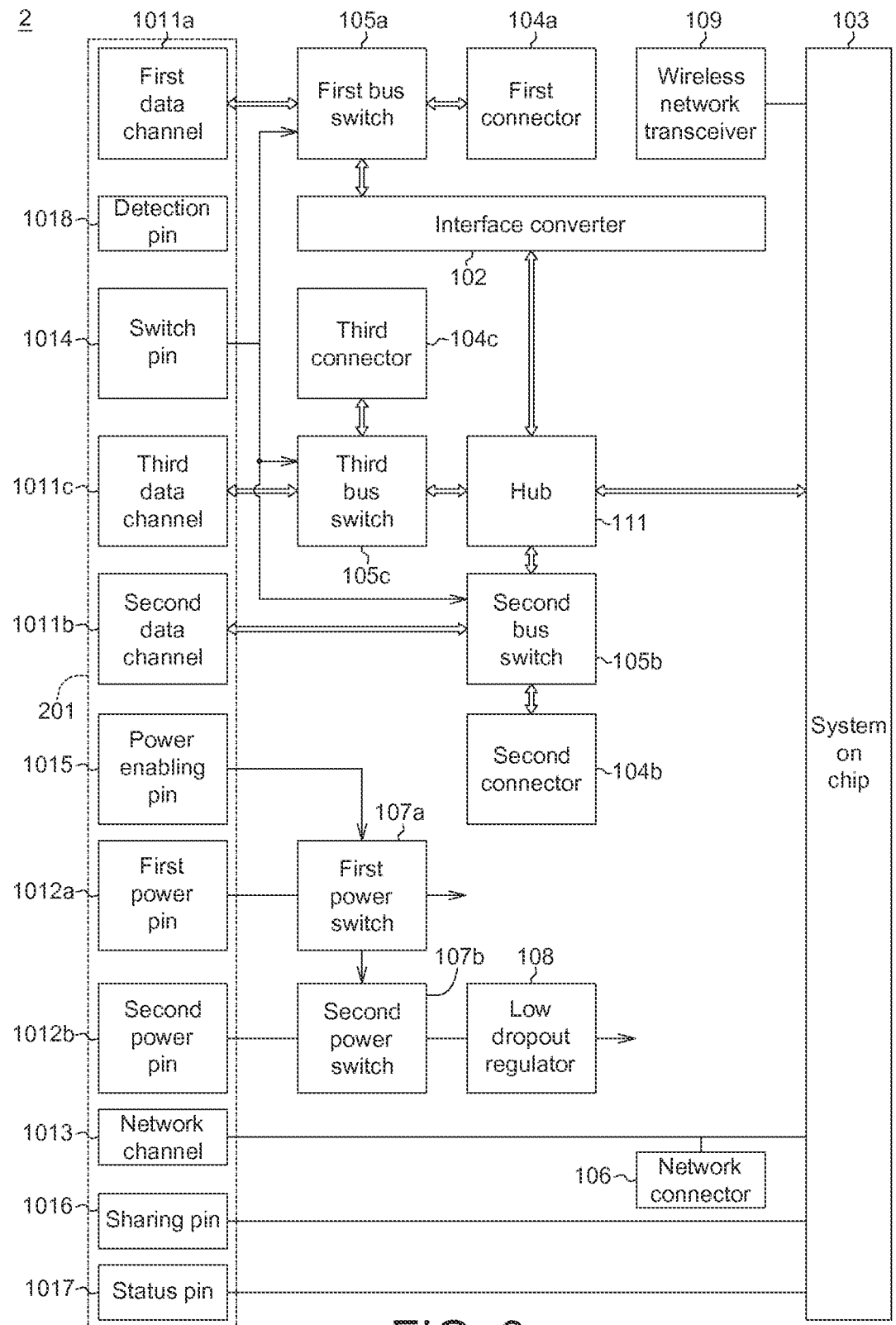
FIG. 3 is a block diagram illustrating an interface card according to a second embodiment.

Referring to Table 1, FIGS. 1 and 3, FIG. 3 is a block diagram illustrating an interface card according to a second embodiment. The main difference between the second and the first embodiment is that the interface card 2 further includes a third connector 104c, a third bus switch 105c, and a hub 111, and the transmission interface 201 further includes a third data channel 1011c. The third connector 104c, for example, is a USB connector, and the third data channel 1011c, for example, includes pins 36 and 38 as exemplified in Table 1. The hub 111 is coupled to the system on chip 103, and the interface converter 102 is coupled to the hub 111. The second bus switch 105b, controlled by the switch pin 1014, couples the second connector 104b to the second data channel 1011b or the hub 111, and the third bus switch 105c, controlled by the switch pin 1014, couples the third connector 104*c* to the third data channel 1011*c* or the hub 111.

Figure 4:
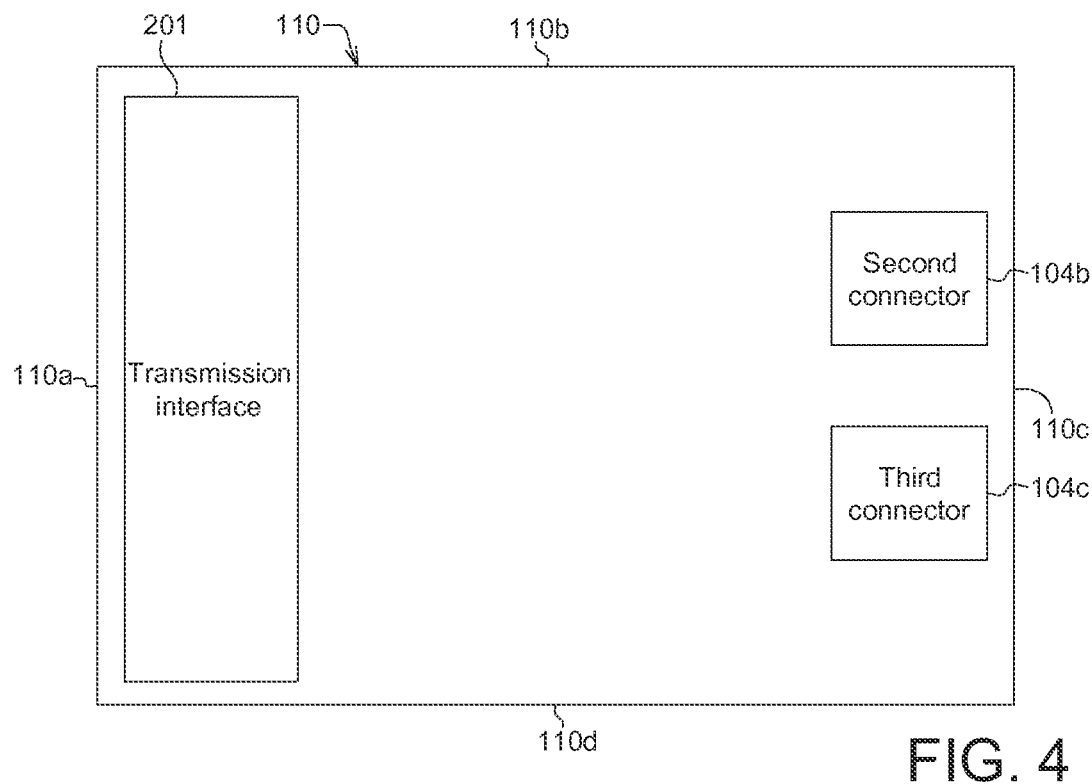
FIG. 4 is a diagram illustrating an arrangement of a transmission interface, a second connector, and a third connector according to the second embodiment.

Referring to FIG. 4, a diagram illustrates an arrangement of a transmission interface, a second connector, and a third connector according to the second embodiment. The transmission interface 201 is disposed near the first side 110*a*, and the second connector 104*b* and the third connector 104*c* are disposed near the third side 110*c*. In this way, if the interface card is designed to be not compliant with the NAS device, a main board of a system may include the second connector 104*b* and the third connector 104*c*, disposed in an exposed manner. Conversely, if the interface card is designed to be compliant with the NAS device, the main board of the system no longer needs to include the second connector 104*b* and the third connector 104*c* to be disposed. When the interface card as shown in FIG. 4 is inserted into the main board of the system, the second connector 104*b* and the third connector 104*c*, disposed on the main board of the system, can be substituted by the second connector 104*b* and the third connector 104*c* of the interface card. In this design, the user can connect to the second storage device externally by using the exposed second connector 104*b*, or can connect to the third storage device externally through the third connector 104*c*, regardless of whether the interface card is compliant with the NAS device or not. The difference is that for one compliant with the NAS device, the second storage device externally connected to the second connector 104*b* or the third storage device externally connected to the third connector 104*c* can be shared for usage.

Figure 5:
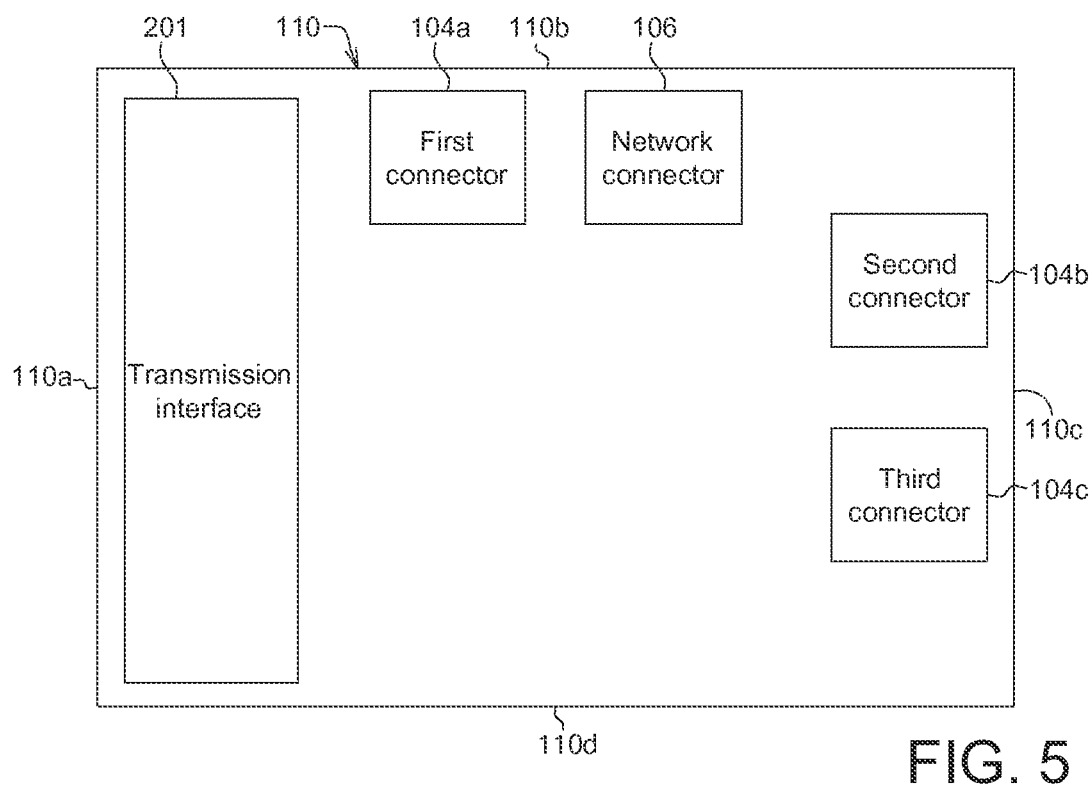
FIG. 5 is a diagram illustrating an arrangement of a first type of a transmission interface, a network connection, a first connector, a second connector, and a third connector according to the second embodiment.

Referring to FIG. 5, a diagram illustrates an arrangement of a first type of a transmission interface, a network connection, a first connector, a second connector, and a third connector according to the second embodiment. The transmission interface 201 is disposed near the first side 110*a*, and the second connector 104*b* and the third connector 104*c* are disposed near the third side 110*c*. The first connector 104*a* and the network connector 106 are disposed near the second side 110*b*. In this way, if the interface card is designed to be not compliant with the NAS device, a main board of a system may include the second connector 104*b* and the third connector 104*c*, disposed in an exposed manner, and the first connector 104*a* and the network connector 106. Conversely, if the interface card is designed to be compliant with the NAS device, the main board of the system no longer needs to include the second connector 104*b* and the third connector 104*c* to be disposed. When the interface card as shown in FIG. 5 is inserted into the main board of the system, the second connector 104*b*, the third connector 104*c*, and the network connector 106, disposed on the main board of the system, can be substituted by the second connector 104*b*, the third connector 104*c*, and the network connector 106 of the interface card. The first connector 104*a* can be employed for internally connecting an internal storage device. In this design, the user can connect to the second storage device externally by using the exposed second connector 104*b*, or can connect to the third storage device externally through the third connector 104*c*, regardless of whether the interface card is compliant with the NAS device or not. The difference is that for one compliant with the NAS device, the second storage device externally connected to the second connector 104*b* or the third storage device externally connected to the third connector 104*c* can be shared for usage.

Figure 6:
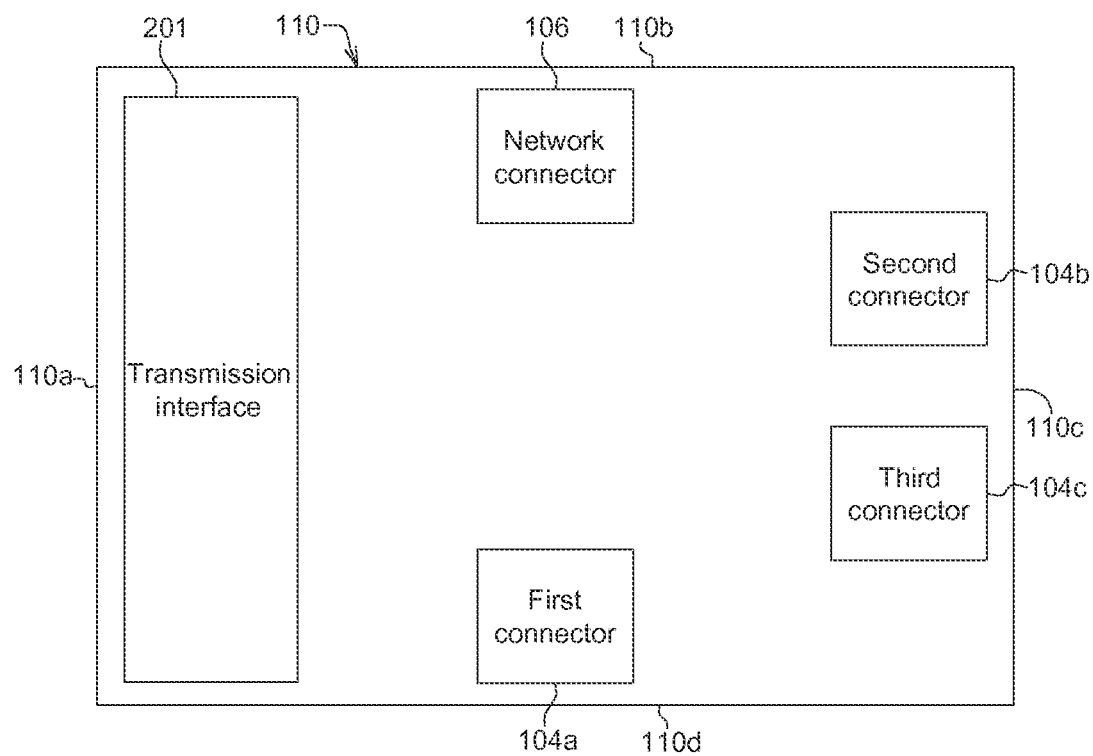
FIG. 6 is a diagram illustrating an arrangement of a second type of a transmission interface, a network connection, a first connector, a second connector, and a third connector according to the second embodiment.

Referring to FIG. 6, a diagram illustrates an arrangement of a second type of a transmission interface, a network connection, a first connector, a second connector, and a third connector according to the second embodiment. The transmission interface 201 is disposed near the first side 110*a*, and the second connector 104*b* and the third connector 104*c* are disposed near the third side 110*c*. The first connector 104*a* is disposed near the fourth side 110*d*, and the network connector 106 is disposed near the second side 110*b*. In this way, if the interface card is designed to be not compliant with the NAS device, a main board of a system may include the second connector 104*b* and the third connector 104*c*, disposed in an exposed manner, and the first connector 104*a* and the network connector 106, disposed on the main board. Conversely, if the interface card is designed to be compliant with the NAS device, the main board of the system no longer needs to include the second connector 104*b* and the third connector 104*c* to be disposed. When the interface card as shown in FIG. 6 is inserted into the main board of the system, the second connector 104*b*, the third connector 104*c*, and the network connector 106, disposed on the main board of the system, can be substituted by the second connector 104*b*, the third connector 104*c*, and the network connector 106 of the interface card. The first connector 104*a* can be employed for internally connecting an internal storage device. In this design, the user can connect to the second storage device externally by using the exposed second connector 104*b*, or can connect to the third storage device externally through the third connector 104*c*, regardless of whether the interface card is compliant with the NAS device or not. The difference is that for one compliant with the NAS device, the second storage device externally connected to the second connector 104*b* or the third storage device externally connected to the third connector 104*c* can be shared for usage.

Third Embodiment

Figure 7:
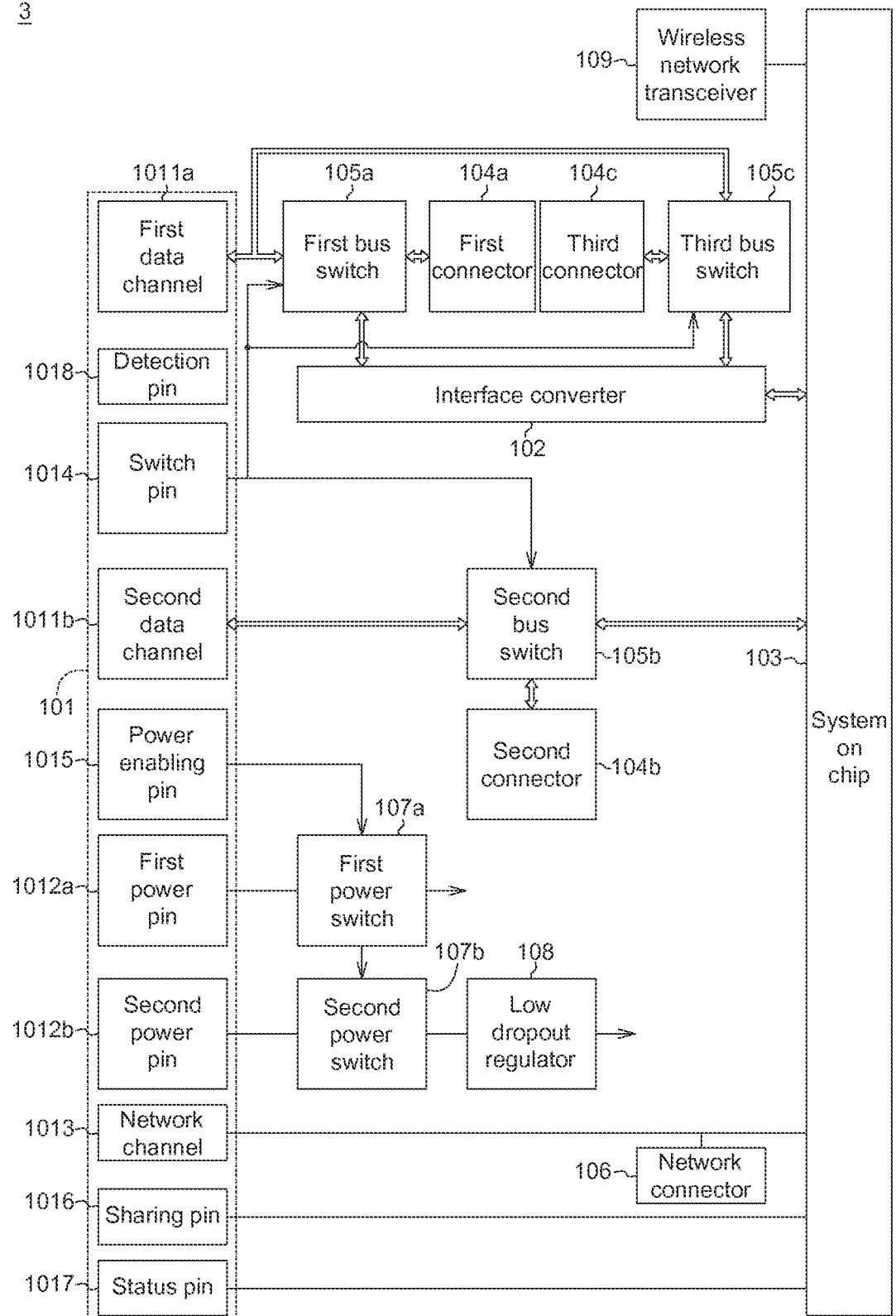
FIG. 7 is a block diagram illustrating an interface card according to a third embodiment.

Referring to FIGS. 1 and 7, FIG. 7 is a block diagram illustrating an interface card 3 according to a third embodiment. The main difference between the third and the first embodiment is that the interface card 3 further includes a third connector 104*c* and a third bus switch 105*c*. The third bus switch 105*c*, controlled by the switch pin 1014, couples the third connector 104*c* to the first data channel 1011*a* or the interface converter 102, and the third connector 104*c*, for example, is a SATA connector or an e-SATA connector, and the second connector is a USB connector, for example.

Fourth Embodiment

Figure 8:
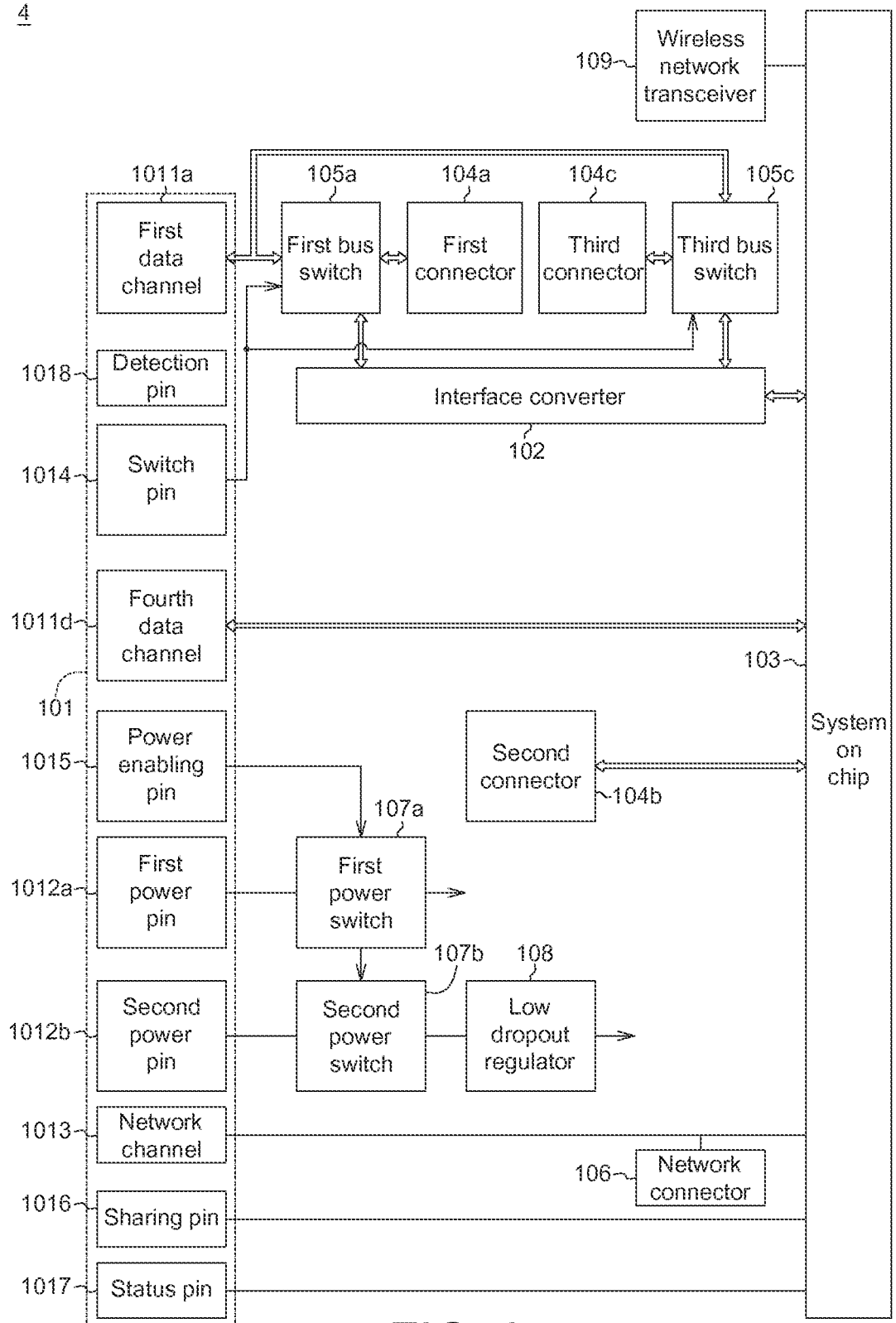
FIG. 8 is a block diagram illustrating an interface card according to a fourth embodiment.

Referring to FIGS. 1 and 8, FIG. 8 is a block diagram illustrating an interface card according to a fourth embodiment. The main difference between the fourth and the first embodiment is that the transmission interface 101 of the interface card 4 further includes a fourth data channel 1011*d*, and the fourth data channel 1011*d* and the second connector 104*b* are connected to the system on chip 103. The fourth data channel 1011*d* is coupled to the system on chip 103 through a PCIE bus, for example. The system on chip 103, after accessing data of the external storage device through the second connector 104*b*, transfers the data of the external storage device to a computer through the PCIE bus. In this way, the fourth embodiment can share not only the computer's internal storage device through the first data channel 1011*a*, but also the external storage device through the fourth data channel 1011*d*.

Fifth Embodiment

TABLE 2

| Pin number | Name |
|---|---|
| Pin 1 | GND_PRESENCE_IND |
| Pin 2 | 3.3VAUX_2 |
| Pin 3 | TYPEDET1 |
| Pin 4 | 3.3VAUX_4 |
| Pin 5 | GND_5 |

TABLE 2-continued

| Pin number | Name |
|---|---|
| Pin 6 | FULL_CARD_POWER_OFF |
| Pin 7 | USB0_D+ |
| Pin 8 | W-DISABLE* |
| Pin 9 | USB0_D- |
| Pin 10 | LED1*/DAS/DSS8 |
| Pin 11 | GND_11 |
| Pin 12 | KEY |
| Pin 13 | KEY |
| Pin 14 | KEY |
| Pin 15 | KEY |
| Pin 16 | KEY |
| Pin 17 | KEY |
| Pin 18 | KEY |
| Pin 19 | KEY |
| Pin 20 | LAN3-/USB3.0-3RX-/SATA3-RX- |
| Pin 21 | WWAN/SSD IND GND-WWAN/OC-SSD |
| Pin 22 | LAN3+/USB3.0-3RX+/SATA3-RX+ |
| Pin 23 | SMB_CLK/UART_TX |
| Pin 24 | LAN2-/USB3.0-3TX-/SATA3-TX- |
| Pin 25 | SMB_DATA/UART_RX |
| Pin 26 | LAN2+/USB3.0-3TX+/SATA3-TX+ |
| Pin 27 | GND_27 |
| Pin 28 | GND_28 |
| Pin 29 | PERN1/USB3.0-1RX- |
| Pin 30 | LAN1-/USB3.0-2RX-/SATA2-RX- |
| Pin 31 | PERP1/USB3.0-1RX+ |
| Pin 32 | LAN1+/USB3.0-3RX+/SATA2-RX+ |
| Pin 33 | GND_33 |
| Pin 34 | LAN0-/USB3.0-2TX-/SATA2-TX- |
| Pin 35 | PETN1/USB3.0-1TX- |
| Pin 36 | LAN0+/USB3.0-2TX+/SATA2-TX+ |
| Pin 37 | PETP1/USB3.0-1TX+ |
| Pin 38 | DEVSLP |
| Pin 39 | GND_39 |
| Pin 40 | GNSS0 |
| Pin 41 | PERN0/SATA1-RX- |
| Pin 42 | GPO0_PWR_EN |
| Pin 43 | PERP0/SATA1-RX+ |
| Pin 44 | GPO1_PCSOC_SEL |
| Pin 45 | GND_45 |
| Pin 46 | GPI0_SOC_SHARING |
| Pin 47 | PETN0/SATA1-1TX- |
| Pin 48 | GPI1_SHARE_SWITCH |
| Pin 49 | PETP0/SATA1-1TX+ |
| Pin 50 | PERST* |
| Pin 51 | GND_51 |
| Pin 52 | CLKREQ* |
| Pin 53 | REFCLKN |
| Pin 54 | PEWAKE* |
| Pin 55 | REFCLKP |
| Pin 56 | 5VAUX_56 |
| Pin 57 | GND_57 |
| Pin 58 | 5VAUX_58 |
| Pin 59 | USB1_D- |
| Pin 60 | 5VAUX_60 |
| Pin 61 | USB1_D+ |
| Pin 62 | 5VAUX_62 |
| Pin 63 | USB2_D- |
| Pin 64 | 5VAUX_64 |
| Pin 65 | USB2_D+ |
| Pin 66 | SIM SETECT |
| Pin 67 | RESET* |
| Pin 68 | SSCLK |
| Pin 69 | PEDET_OC-PCIE/GND-SATA |
| Pin 70 | 32VAUX_70 |
| Pin 71 | GND_71 |
| Pin 72 | 3.3VAUX_72 |
| Pin 73 | TYPEDET2 |
| Pin 74 | 3.3VAUX_74 |
| Pin 75 | USB3.0-IND/GND-OTHER |

Referring to FIG. 1 and Table 2, Table 2 illustrates a definition of pins of the transmission interface according to a fifth embodiment. The main difference between the fifth and the first embodiment is that the transmission interface 101 in the fifth embodiment is changed to be compliant with a next generation form factor (NGFF) interface. The 67 pins of the NGFF interface and positions of KEY are defined as exemplified in Table 2. The positions of KEY can be defined in different positions. For example, KEY positions for type A can be defined by pins 8 to 15, and KEY positions for type B can be defined by pins 12 to 19. For the sake of illustration, type B is taken in the fifth embodiment for example. The 67 pins of the NGFF interface, except for KEY positions, can be categorized into types of signal, control signal, and power; for example, the type of signals: PCIE/SATA/USB/LAN, the type of control signals: GPI/GPO/UART, and the type of power: 5Vaux/3.3Vaux.

For example, the first data channel 1011a includes pins 41, 43, 47, and 49, as shown in Table 2. The second data channel 1011b includes pins 63 and 65, as exemplified in Table 2. The network channel 1013, for example, includes pins 20, 22, 24, 26, 30, 32, 34, and 36, as in Table 2. The first power pin 1012a, for example, includes pins 56, 58, 60, 62, and 64, as in Table 2, wherein the first power pin 1012a transmits a working voltage of 5V. The second power pin 1012b, for example, includes pins 2, 4, 70, 72, and 74, as in Table 2, wherein the second power pin 1012b transmits a working voltage of 3.3V. The switch pin 1014 is pin 44 and the power enabling pin 1015 is pin 42, as exemplified in Table 2. The sharing pin 1016 is pin 48 and the status pin 1017 is pin 46, as exemplified in Table 2. The detection pin 1018, for example, includes pins 3 and 73 of Table 2.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An interface card apparatus, comprising:
   a transmission interface, comprising:
      a first data channel;
      a first power pin;
      a network channel;
      a switch pin;
      a power enabling pin; and
      a sharing pin;
   an interface converter;
   a system on chip, controlled by the sharing pin, for performing a file sharing program;
   a first connector;
   a first bus switch, controlled by the switch pin, for coupling the first connector to the first channel or the interface converter;
   a network connector, coupled the system on chip and the network channel; and
   a first power switch, controlled by the power enabling pin, for coupling the first power pin to the system on chip.

2. The interface card apparatus according to claim 1, wherein the interface converter is coupled to the system on chip.

3. The interface card apparatus according to claim 2, wherein the transmission interface further comprises a second data channel; the interface card apparatus further comprises a second connector and a second bus switch; the second bus switch, controlled by the switch pin, couples the second connector to the second data channel or the system on chip.

4. The interface card apparatus according to claim 3, wherein the first connector is a serial advanced technology attachment (SATA) connector or an external SATA connector, and the second connector is a universal serial bus connector.

5. The interface card apparatus according to claim 4, wherein the transmission interface further comprises a second power pin; the interface card apparatus further comprises a second power switch and a low-dropout regulator; and the second power switch, controlled by the power enabling pin, couples the second power pin to the low-dropout regulator.

6. The interface card apparatus according to claim 5, wherein the transmission interface further comprises a status pin for indicating status of the data access by the system on chip.

7. The interface card apparatus according to claim 6, wherein the transmission interface further comprises a detection pin for detecting type of the interface card apparatus.

8. The interface card apparatus according to claim 7, further comprising:
a wireless network transceiver, coupled to the system on chip.

9. The interface card apparatus according to claim 8, further comprising a printed board circuit, wherein the printed board circuit comprises a first side, a second side, a third side, and a fourth side, the first side is opposite the third side; the second side is opposite is opposite the fourth side; the transmission interface is disposed near the first side; and the first connector and the second connector are disposed near the third side.

10. The interface card apparatus according to claim 9, wherein the transmission interface is compliant with a mini-PCIE interface.

11. The interface card apparatus according to claim 9, wherein the transmission interface is compliant with an NGFF interface.

12. The interface card apparatus according to claim 1, wherein the transmission interface further comprises a second data channel and a third data channel; the interface card apparatus further comprises a hub, a second connector, a third connector, a second bus switch, and a third bus switch; the hub is coupled to the system on chip; the second bus switch, controlled by the switch pin, couples the second connector to the second data channel or the hub; and the third bus switch, controlled by the switch pin, couples the third connector to the third data channel or the hub.

13. The interface card apparatus according to claim 1, wherein the interface converter is coupled to the hub.

14. The interface card apparatus according to claim 13, wherein the first connector is a serial advanced technology attachment (SATA) connector or an external SATA connector, and the second connector and the third connector are universal serial bus connectors.

15. The interface card apparatus according to claim 14, further comprising a printed board circuit, wherein the printed board circuit comprises a first side, a second side, a third side, and a fourth side; the first side is opposite the third side; the second side is opposite is opposite the fourth side; the transmission interface is disposed near the first side; and the second connector and the third connector are disposed near the third side.

16. The interface card apparatus according to claim 15, wherein the first connector and the network connector are disposed near the second side.

17. The interface card apparatus according to claim 1, further comprising a printed board circuit, wherein the printed board circuit comprises a first side, a second side, a third side, and a fourth side; the first side is opposite the third side; the second side is opposite is opposite the fourth side; the transmission interface is disposed near the first side; the second connector and the third connector are disposed near the second side; the network connector is disposed near the third side, and the first connector is disposed near the fourth side.

18. The interface card apparatus according to claim 1, wherein the transmission interface further comprises a second data channel; the interface card apparatus further comprises a second connector, a third connector, a second bus switch, and a third bus switch; the second bus switch, controlled by the switch pin, couples the second connector to the second data channel or the system on chip; and the third bus switch, controlled by the switch pin, couples the third connector to the first data channel or the interface converter.

19. The interface card apparatus according to claim 1, wherein each of the first connector and the third connector is a serial advanced technology attachment (SATA) connector or an external SATA connector, and the second connector is a universal serial bus connector.

20. The interface card apparatus according to claim 1, wherein the transmission interface further comprises a fourth data channel; the interface card apparatus further comprises a second connector; the fourth data channel and the second connector are connected to the system on chip.

* * * * *